(12) United States Patent
Austin et al.

(10) Patent No.: US 11,707,792 B2
(45) Date of Patent: Jul. 25, 2023

(54) SCATTERED TOPOGRAPHY ROLLING OF POWERED METAL GEARS

(71) Applicant: GM Global Technology Operations LLC, Detroit, MI (US)

(72) Inventors: Jason L. Austin, Royal Oak, MI (US); Dale A. Gerard, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 17/034,373

(22) Filed: Sep. 28, 2020

(65) Prior Publication Data

US 2022/0097159 A1 Mar. 31, 2022

(51) Int. Cl.
| | |
|---|---|
| B21H 5/02 | (2006.01) |
| B23F 5/20 | (2006.01) |
| F16H 55/17 | (2006.01) |
| F16H 55/08 | (2006.01) |
| B21H 1/22 | (2006.01) |

(52) U.S. Cl.
CPC .............. B23F 5/205 (2013.01); B21H 1/22 (2013.01); B21H 5/02 (2013.01); F16H 55/08 (2013.01); F16H 55/17 (2013.01); *F16H 2055/086* (2013.01)

(58) Field of Classification Search
CPC .... B21H 5/00; B21H 5/02; B21H 1/22; Y10T 29/49471; F16H 55/16; B22F 5/08; B23F 5/205
USPC ................................................... 74/443, 462
See application file for complete search history.

(56) References Cited

U.S. PATENT DOCUMENTS

| | | | | |
|---|---|---|---|---|
| 2,886,990 A | * | 5/1959 | Bregi ........................ | B21H 5/02 29/893.32 |
| 2,934,980 A | * | 5/1960 | Grob ........................ | B21H 5/02 72/95 |
| 3,817,117 A | * | 6/1974 | Kita ........................ | F04C 2/084 74/462 |
| 4,708,912 A | * | 11/1987 | Huppmann ................ | B22F 3/18 428/548 |
| 5,454,702 A | * | 10/1995 | Weidhass ................ | F04C 2/084 74/462 |
| 5,711,187 A | * | 1/1998 | Cole ........................ | C21D 9/32 74/460 |

(Continued)

FOREIGN PATENT DOCUMENTS

| | | |
|---|---|---|
| CN | 107304803 A | 10/2017 |
| EP | 1888278 B1 | 1/2012 |
| WO | 2018177563 A1 | 10/2018 |

OTHER PUBLICATIONS

WO 2012/037593A2, Mittermair et al. Mar. 2012.*

(Continued)

*Primary Examiner* — Edward T Tolan
(74) *Attorney, Agent, or Firm* — Vivacqua Crane PLLC

(57) ABSTRACT

A method to form a gear for motor vehicles includes one or more of the following: placing a blank between a first tool member and a second tool member, each of the first tool member and the second tool member having a set of teeth; and moving the first tool member and the second tool member towards the blank while rotating the first tool member and the second tool member to form a gear with a set of teeth from the blank. Each tooth of the set of teeth has a topography that varies tooth-to-tooth.

16 Claims, 3 Drawing Sheets

(56) References Cited

U.S. PATENT DOCUMENTS

| | | | | |
|---|---|---|---|---|
| 6,164,944 | A * | 12/2000 | Martin | F04C 15/0049 |
| | | | | 418/206.5 |
| 7,137,312 | B2 * | 11/2006 | Cole | B22F 5/085 |
| | | | | 74/462 |
| 8,225,690 | B2 * | 7/2012 | Shimada | F16H 57/0006 |
| | | | | 74/462 |
| 8,402,659 | B2 * | 3/2013 | Kotthoff | F16H 55/06 |
| | | | | 29/893.3 |
| 8,984,981 | B2 * | 3/2015 | Mueller | F16H 55/06 |
| | | | | 74/460 |
| 2004/0016123 | A1 * | 1/2004 | Sandner | B21H 5/022 |
| | | | | 29/893 |
| 2008/0138562 | A1 * | 6/2008 | Kotthoff | B21H 5/022 |
| | | | | 428/66.1 |
| 2017/0299039 | A1 * | 10/2017 | Moetakef | F16H 55/16 |
| 2019/0262891 | A1 * | 8/2019 | Hirayama | F16H 55/16 |

OTHER PUBLICATIONS

WO 2010/132914A1, Mittermair et al. Nov. 2010.*
JP 10-176203A, Oonishi et al. Jun. 1998.*
WO 2011057311 A1, Roessler et al. May 2011.*
Wang Deguang et al., High densification Forming of Metal Powder and Its Numerical Simulation, Apr. 2015, pp. 98-99, Hefei University of Technology Press.

\* cited by examiner

SCATTERED TOPOGRAPHY ROLLING OF POWERED METAL GEARS

INTRODUCTION

The present disclosure relates to forming metal gears for motor vehicles. More particularly, the present disclosure relates to forming metal gears scattered tooth-to-tooth topography.

A typical motor vehicle is made of many different components. Many of these components incorporate a set of gears to operate the component. During the operation of these components, the noise, vibration and harshness (NVH) generated by these components may not be suitable in certain situations. To reduce NVH in various components, manufacturing of the gears for these components requires multiple processes.

Thus, while current systems and process to form gears achieve their intended purpose, there is a need for a new and improved system and method for forming gears to reduce NVH while being cost effective.

SUMMARY

According to several aspects, a method to form a gear for motor vehicles includes one or more of the following: placing a blank between a first tool member and a second tool member, each of the first tool member and the second tool member having a set of teeth; and moving the first tool member and the second tool member towards the blank while rotating the first tool member and the second tool member to form a gear with a set of teeth from the blank. Each tooth of the set of teeth has a topography that varies tooth-to-tooth.

In an additional aspect of the present disclosure, the blank is made of powered metal.

In another aspect of the present disclosure, the surface of each tooth of the set of teeth is densified to increase the hardness and strength of the surface of each tooth.

In another aspect of the present disclosure, the Young's modulus decreases as a distance from an edge of the surface increases.

In another aspect of the present disclosure, the topography results in random excitation during an operation of the gear.

In another aspect of the present disclosure, the surface of a gear tooth is densified and the set of teeth have a random tooth-to-tooth topography.

In another aspect of the present disclosure, the surface of a gear tooth is densified and the set of teeth have a pre-determined variable tooth-to-tooth topography.

According to several aspects, a method to form a gear for motor vehicles includes one or more of the following: placing a blank between a first tool member and a second tool member, the blank being made of powered metal, each of the first tool member and the second tool member having a set of teeth; and moving the first tool member and the second tool member towards the blank while rotating the first tool member and the second tool member to form a gear with a set of teeth from the blank by cold rolling. The set of teeth of the gear has a scattered tooth-to-tooth topography.

In another aspect of the present disclosure, the surface of each tooth of the set of teeth is densified to increase the hardness and strength of the surface of each tooth.

In another aspect of the present disclosure, the Young's modulus decreases as a distance from an edge of the surface increases.

In another aspect of the present disclosure, the topography results in random excitation during an operation of the gear.

In another aspect of the present disclosure, the surface of a gear tooth is densified and the set of teeth have a random tooth-to-tooth topography.

In another aspect of the present disclosure, the surface of a gear tooth is densified and the set of teeth have a pre-determined variable tooth-to-tooth topography.

In another aspect of the present disclosure, the tooth-to-tooth topography has varying micro-geometry parameters.

In another aspect of the present disclosure, the micro-geometry parameters include variations in at least one of tooth-to-to spacing error, profile crown, lead crown, profile slope, lead slope, or profile tip relief.

According to several aspects, a gear for a motor vehicle includes a set of teeth formed from a blank by cold rolling. The set of teeth has a random tooth-to-tooth topography.

In another aspect of the present disclosure, the tooth-to-tooth topography has varying micro-geometry parameters.

In another aspect of the present disclosure, the micro-geometry parameters include variations in at least one of tooth-to-to spacing error, profile crown, lead crown, profile slope, lead slope, or profile tip relief.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
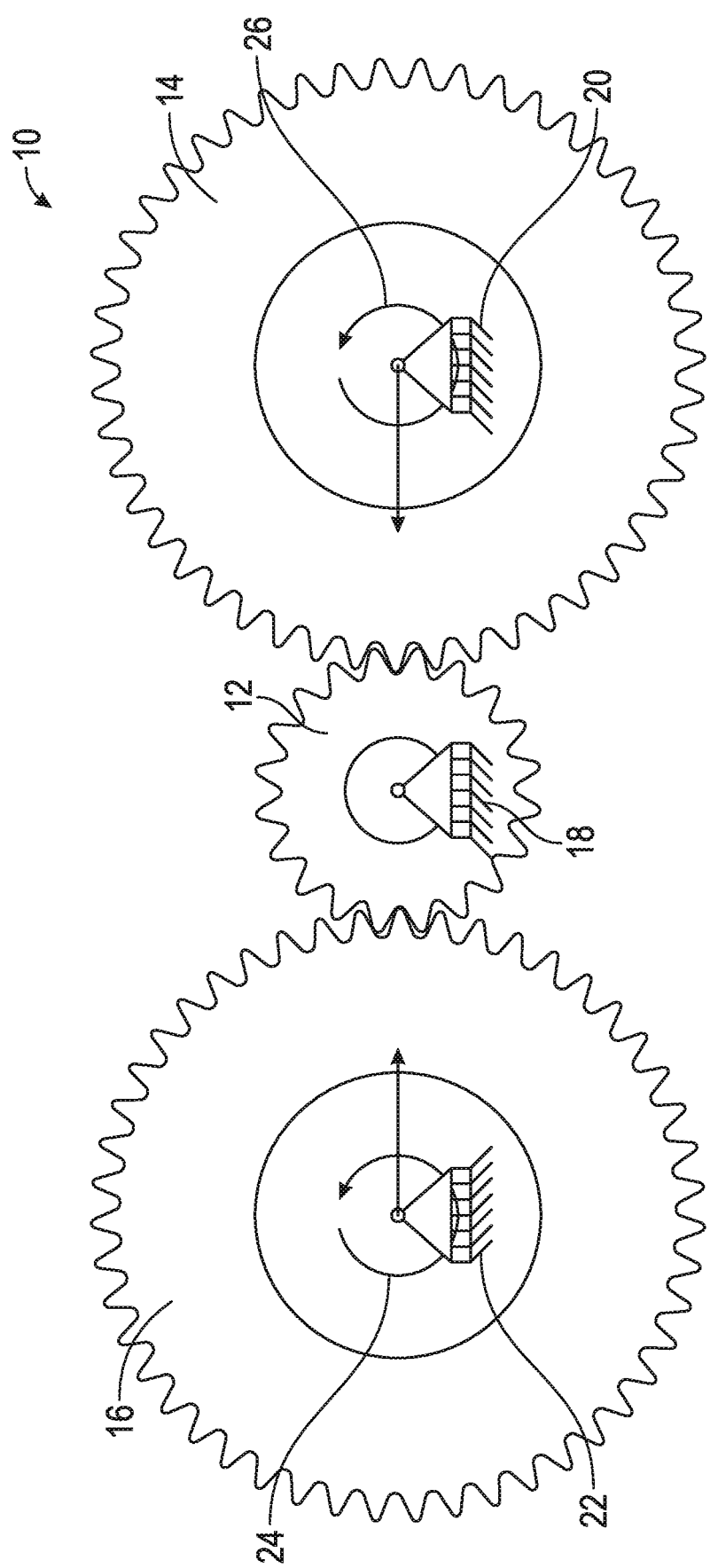
FIG. 1 shows a system to form a gear with scattered topography in accordance with an exemplary embodiment.

Referring to FIG. 1, there is shown a system 10 to form a gear 12 by cold rolling process fora motor vehicle. In certain arrangements, the gear 12 is made of a powered metal. The system 10 includes a first tool 14 and a second tool 16. In various arrangements, the first tool 14 and the second tool 16 are made of steel. The first tool 14 has a set of forming teeth and is mounted to a platform 20. The first tool 14 is mounted in a manner to allow the first tool 14 to rotate relative to the platform 20, as indicated by the arrow 26. The second tool 16 has a set of forming teeth and is mounted to a platform 22. The second tool 16 is mounted in a manner to allow the second tool 16 to rotate relative to the platform 22, as indicated by the arrow 24.

The gear 12 is mounted initially as a blank to a platform 18. The gear 12 is mounted in a manner to the platform 18 to allow the gear 12 to rotate relative to the platform 18 during the forming process to make the gear 12. During the forming process the platform 18 is stationary while the platforms 20 and 22 are linearly movable. As such, the platforms 20 and 22 move inwardly during the during the cold rolling process to apply pressure to the blank to form the teeth on the gear 12 by the teeth on the first tool 14 and the second tool 16. In some arrangements, the cold rolling of the gear 12 proceeds by cold rolling a cylindrical blank without any teeth. In other arrangements, the cold rolling of the gear 12 proceeds by cold rolling a blank that has a set of teeth.

Figure 2:
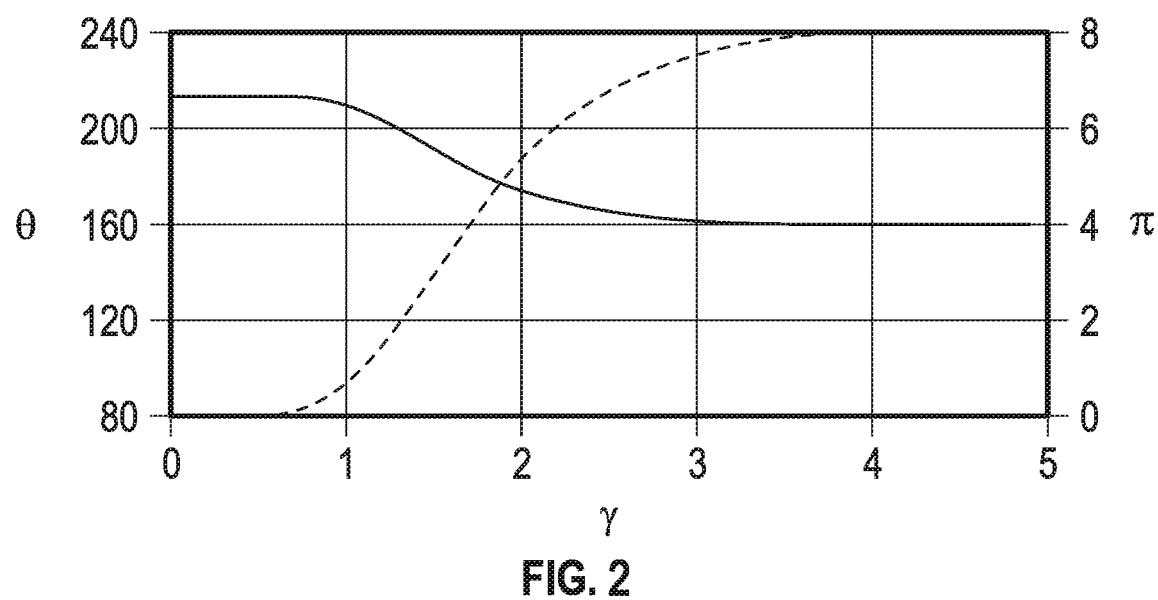
FIG. 2 is a graph Young's modulus and porosity versus edge distance from a surface of a gear in accordance with an exemplary embodiment.

As the gear 12 is formed, the surface density of the gear 12 increases to increase the hardness and strength of material at the surface of the teeth of the gear 12. FIG. 2 shows a graph in the variation of the Young's modulus (GPa), as indicated by θ, and the porosity (%), as indicated by π, as a function of the distance from the edge of the surface (mm), as indicated by γ.

Figure 3:
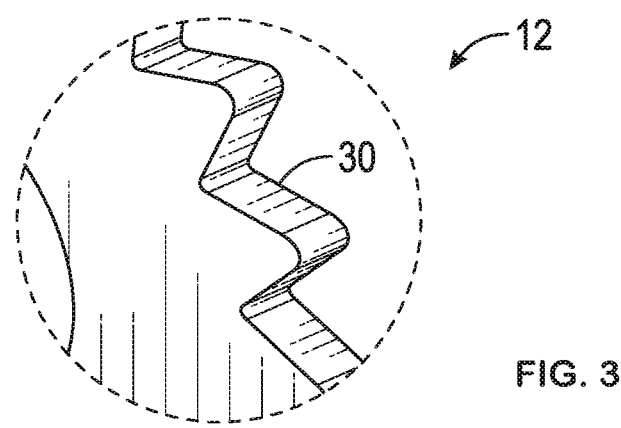
FIG. 3 is a perspective partial view of a gear formed with the system shown in FIG. 1 in accordance with an exemplary embodiment.

Referring to FIG. 3, there is shown a tooth 30 of the set of teeth formed in the gear 12. During the formation of the gear 12, the blank of the gear 12 made of powered metal is rolled against the tools 14 and 16, which are made of a harder steel. This densifies the teeth of the gear 12, thereby increasing the harness and strength of the material of the teeth of the gear 12. Further, the teeth of the tools 14 and 16 apply a scattered topography to the teeth 30 of the gear 12 during the cold rolling process. The scattered topography disrupts the periodic nature of gear excitations by imparting random tooth-to-tooth geometry modifications. This randomized excitation reduces the tonality of noise generated by a set of gears, which has a significant impact of the perceived sound quality produced by the set of gears. Accordingly, the set of teeth of the first tool 14 and the set of teeth of the second tool 16 have a randomized tooth-to-tooth micro geometry or a predetermined tooth-to-tooth variable micro geometry to produce teeth 30 with varying topography. Hence, the gear 12 acquires a surface that is densified with a varying micro geometry topography, that in some applications is random in nature that results in random excitation during the operation of the gear 12.

Figure 4A:
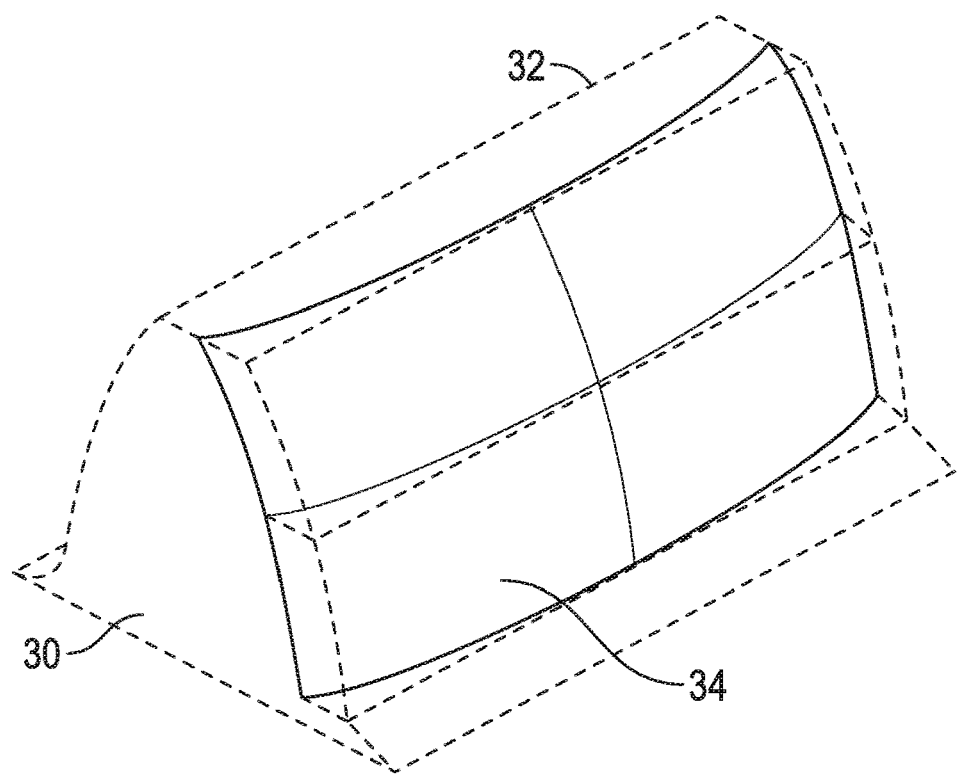
FIG. 4A is a perspective view of a tooth of a gear with a topography in accordance with an exemplary embodiment.
Figure 4B:
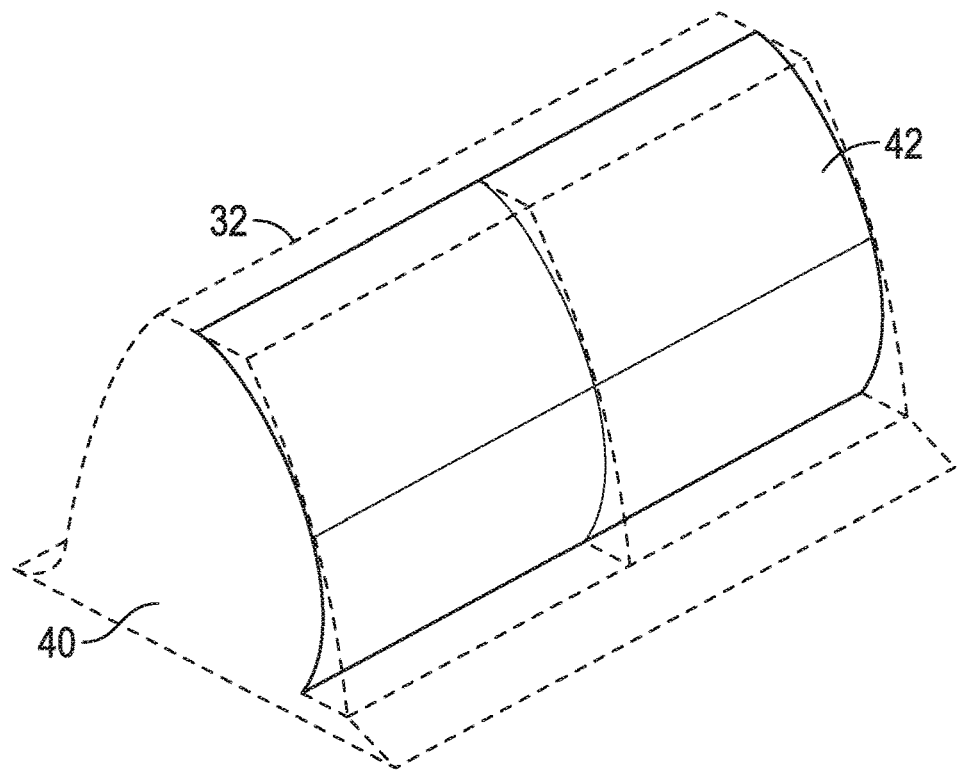
FIG. 4B is a perspective view of a tooth of a gear with another topography in accordance with an exemplary embodiment.

Referring now to FIGS. 4A and 4B, there are shown the tooth 30 and a tooth 40 with vary micro geometries or topographies. An outline 32 shows in both figures shows a tooth with a nominal geometry. FIG. 4A shows the tooth 30 with a profile 34 in which the edges are curved in, and FIG. 4B shows a tooth with a profile 42 curved in at the tooth of the tooth 40 and the bottom of the tooth. FIGS. 4A and 4B show just two examples of a tooth with various micro geometries. Other micro geometry parameters include variations in at least one of tooth-to-to spacing error, profile crown, lead crown, profile slope, lead slope, or profile tip relief. Hence, the teeth of the tools 14 and 16 can have teeth with randomized micro geometries or a predetermined set of teeth with variable micro geometries. These micro-geometries are then imparted on the set of teeth of the gear 12.

A gear with scattered topography of the present disclosure offers several advantages. These include a convergence of multiple processes in a single process. Namely, the strengthening of the surface of the teeth of the gear and the application of a varying micro geometry on the surface of the teeth is accomplished in a single process. Moreover, the process provides NVH improvement by decreasing the tonality of the noise generated by a set of gears.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method to form a gear for motor vehicles, the method comprising:
   placing a blank between a first tool member and a second tool member, each of the first tool member and the second tool member having a set of teeth, wherein each tooth of the sets of teeth of the first tool member and the second tool member has a topography with a corresponding micro-geometry shape parameter that varies tooth-to-tooth; and
   moving the first tool member and the second tool member towards the blank while rotating the first tool member and the second tool member to form a gear with a set of teeth from the blank by rolling and impart the topographies of each tooth of the sets of teeth of the first and second tool members to the set of teeth of the formed gear such that each tooth of the formed gear has a topography with a corresponding micro-geometry shape parameter that varies tooth-to-tooth, wherein a surface of each tooth of the set of teeth of the gear being formed is densified during the rotating of the first tool member and the second tool member.

2. The method of claim 1, wherein the blank is made of powdered metal.

3. The method of claim 1, wherein the hardness and strength of the surface of each tooth of the set of teeth of the formed gear is increased during the forming of the gear.

4. The method of claim 3, wherein Young's modulus of the formed gear decreases as a distance inwardly from an edge of a surface of a tooth of the formed gear increases.

5. The method of claim 1, wherein the set of teeth of the formed gear have a tooth-to-tooth topography with randomly varying micro-geometry parameters.

6. The method of claim 1, wherein the blank is cylindrical without any teeth.

7. The method of claim 1, wherein the blank has a set of teeth.

8. The method of claim 1, wherein the blank is mounted to a platform and the platform is stationary during the forming of the gear from the blank by rolling.

9. The method of claim 1, wherein the gear with the set of teeth is formed from the blank by cold rolling.

10. A method to form a gear for motor vehicles, the method comprising:
    placing a blank between a first tool member and a second tool member, the blank being made of powdered metal, each of the first tool member and the second tool member having a set of teeth, wherein the set of teeth of the first tool member and the second tool member have topographies with micro-geometry shape parameters that vary tooth-to-tooth; and
    moving the first tool member and the second tool member towards the blank while rotating the first tool member and the second tool member to form a gear with a set of teeth from the blank by cold rolling and impart the topographies of the sets of teeth of the first and second tool members to the set of teeth of the formed gear such that the set of teeth of the formed gear has a scattered tooth-to-tooth topography with micro-geometry shape parameters that vary tooth-to-tooth, wherein a surface of each tooth of the set of teeth of the gear being formed is densified during the rotating of the first tool member and the second tool member to increase the hardness and strength of the surface of each tooth of the set of teeth of the formed gear.

11. The method of claim 10, wherein Young's modulus of the formed gear decreases as a distance inwardly from an edge of a surface of a tooth of the formed gear increases.

12. The method of claim 10, wherein the set of teeth of the formed gear have a tooth-to-tooth topography with randomly varying micro-geometry shape parameters.

13. The method of claim 10, wherein the micro-geometry shape parameters include variations in at least one of tooth-to-tooth spacing error, profile crown, lead crown, profile slope, lead slope, or profile tip relief.

14. The method of claim 10, wherein the blank is cylindrical without any teeth.

15. The method of claim 10, wherein the blank has a set of teeth.

16. The method of claim 10, wherein the blank is mounted to a platform and the platform is stationary during the forming of the gear from the blank by rolling.

\* \* \* \* \*